(12) United States Patent
Forret et al.

(10) Patent No.: US 9,297,528 B2
(45) Date of Patent: Mar. 29, 2016

(54) CHEMICAL LOOPING METHOD FOR THE COMBUSTION OF HEAVY LIQUID HYDROCARBON FRACTIONS

(75) Inventors: Ann Forret, Longes (FR); William Pelletant, Saint-Génis-Laval (FR); Ali Hoteit, Lyons (FR)

(73) Assignees: IFP ENERGIES NOUVELLES, Rueil-Malmaison (FR); TOTAL S.A., Courbevoie (FR)

( * ) Notice: Subject to any disclaimer, the term of this patent is extended or adjusted under 35 U.S.C. 154(b) by 1177 days.

(21) Appl. No.: 12/990,395

(22) PCT Filed: Apr. 28, 2009

(86) PCT No.: PCT/FR2009/000498
§ 371 (c)(1),
(2), (4) Date: Jan. 13, 2011

(87) PCT Pub. No.: WO2009/138588
PCT Pub. Date: Nov. 19, 2009

(65) Prior Publication Data
US 2011/0097673 A1    Apr. 28, 2011

(30) Foreign Application Priority Data
Apr. 30, 2008  (FR) ...................................... 08 02450

(51) Int. Cl.
*F23L 7/00*    (2006.01)
*F23D 3/40*   (2006.01)
(Continued)

(52) U.S. Cl.
CPC . *F23C 10/00* (2013.01); *B01J 8/22* (2013.01); *B01J 19/0093* (2013.01); *C01B 3/344* (2013.01); *C01B 3/386* (2013.01); *C01B 3/44* (2013.01); *C01B 3/48* (2013.01); *B01J 2208/00212* (2013.01); *B01J 2208/00548* (2013.01);
(Continued)

(58) Field of Classification Search
USPC .................................................... 431/2, 3, 4, 5
See application file for complete search history.

(56) References Cited

U.S. PATENT DOCUMENTS 2,106,013 A * 1/1938 Ocon ............................... 208/57
3,989,481 A * 11/1976 Kunii et al. ..................... 48/215
(Continued)

FOREIGN PATENT DOCUMENTS

| FR | 2.227.315 | 11/1974 |
|---|---|---|
| WO | WO 2007/082089 A2 | 7/2007 |
| WO | WO 2008/036902 A2 | 3/2008 |

OTHER PUBLICATIONS

Leion et. al (Leion, Henrik. Mattisson, Tobias., Lyngfelt, Anders. "The use of petroleum coke as fuel in chemical-looping combustion". Fuel. Dec. 28, 2006.*
(Continued)

*Primary Examiner* — Avinash Savani
*Assistant Examiner* — Vivek Shirsat
(74) *Attorney, Agent, or Firm* — Fitch, Even, Tabin and Flannery LLP (57) ABSTRACT

The invention relates to a method for upgrading heavy liquid fractions resulting from oil refining, by combustion in a fluidized-bed chemical looping process. The method according to the invention allows energy to be produced by oxidizing totally the heavy liquid feeds while allowing direct capture of the $CO_2$ emitted in the combustion fumes. The method according to the invention also allows a synthesis gas to be produced.

8 Claims, 5 Drawing Sheets

(51) Int. Cl.
*F23C 10/00* (2006.01)
*B01J 8/22* (2006.01)
*B01J 19/00* (2006.01)
*C01B 3/34* (2006.01)
*C01B 3/38* (2006.01)
*C01B 3/44* (2006.01)
*C01B 3/48* (2006.01)

(52) U.S. Cl.
CPC .......... *B01J2208/00973* (2013.01); *B01J 2219/00788* (2013.01); *B01J 2219/00826* (2013.01); *B01J 2219/00835* (2013.01); *B01J 2219/00873* (2013.01); *B01J 2219/00957* (2013.01); *B01J 2219/00986* (2013.01); *C01B 2203/0261* (2013.01); *C01B 2203/0283* (2013.01); *C01B 2203/062* (2013.01); *C01B 2203/065* (2013.01); *C01B 2203/08* (2013.01); *C01B 2203/1058* (2013.01); *C01B 2203/86* (2013.01); *F23C 2900/99008* (2013.01); *Y02E 20/346* (2013.01); *Y02P 30/30* (2015.11)

(56) References Cited

U.S. PATENT DOCUMENTS

| | | | | |
|---|---|---|---|---|
| 4,542,114 A * | 9/1985 | Hegarty | ............. | 502/39 |
| 4,724,068 A * | 2/1988 | Stapp | ............. | 208/213 |
| 5,316,750 A * | 5/1994 | Szegu et al. | ............. | 423/451 |
| 5,447,024 A * | 9/1995 | Ishida et al. | ............. | 60/775 |
| 5,827,496 A * | 10/1998 | Lyon | ............. | 423/659 |
| 5,906,806 A * | 5/1999 | Clark | ............. | 423/437.1 |
| 6,007,699 A * | 12/1999 | Cole | ............. | 208/134 |
| 6,119,606 A * | 9/2000 | Clark | ............. | 110/345 |
| 6,143,203 A * | 11/2000 | Zeng et al. | ............. | 252/373 |
| 6,878,362 B2 * | 4/2005 | Kumar et al. | ............. | 423/651 |
| 7,700,005 B2 * | 4/2010 | Inui et al. | ............. | 252/373 |
| 7,780,749 B2 * | 8/2010 | Kulkarni et al. | ............. | 48/61 |
| 2003/0111388 A1 * | 6/2003 | Zhang et al. | ............. | 208/113 |
| 2005/0175533 A1 * | 8/2005 | Thomas et al. | ............. | 423/657 |
| 2007/0124997 A1 * | 6/2007 | Liu et al. | ............. | 48/198.7 |
| 2008/0164443 A1 * | 7/2008 | White et al. | ............. | 252/373 |
| 2011/0094226 A1 * | 4/2011 | McHugh et al. | ............. | 60/645 |
| 2011/0129408 A1 * | 6/2011 | Jadhav | ............. | 423/437.1 |

OTHER PUBLICATIONS

Lyngfelt, Anders. LEckner, Bo, and Mattisson, Tobias. "A Fluidized-bed combustion process with inherent CO2 separation; applicaiton of chemical-looping combustion". CHemical Engineering Science. 2001.*
US Energy Information Administration (EIA)-Glossary.*
Adanez, Juan. Garcia-Labiano, Francisco. Diego, Luis, F. Plata, Ainhoa. Celaya, Javier. Gayan, Pilar. Abad, Alberto. "Optimizing the Fuel Reactor for Chemical Looping Combustion". Proceedings of FBC2003. 17$^{th}$ International Fluidized Bed Combustion Conference. May 18-21, 2003, Jacksonville, Florida, USA.*
Journal Officiel De La Republique, Sep. 27, 1967, XP-002507514, Fuel-Oil Lourd N° 2—Art. 2.

* cited by examiner

CHEMICAL LOOPING METHOD FOR THE COMBUSTION OF HEAVY LIQUID HYDROCARBON FRACTIONS

FIELD OF THE INVENTION

The invention relates to contacting heavy liquid feeds with solid particles capable of yielding oxygen in a reduction reaction zone. The oxygen yielded by the particles allows combustion of the liquid feed to be achieved. The effluents of the combustion zone essentially contain gaseous oxides resulting from the combustion, and steam. The particles that have taken part in the combustion are then discharged to an oxidation reaction zone where they are re-oxidized through contact with air. The continuous circulation of the oxidized particles between the two zones allows continuous combustion of the liquid feed to be performed while avoiding direct contact between the liquid feed and air. This method allows combustion of the fuel to be carried out in the absence of nitrogen and to produce CO2-concentrated and nitrogen-free fumes that facilitate CO2 sequestration.

We have discovered that liquids of petroleum by-products type can be used as feeds for the chemical looping combustion method, in order to burn them either totally and to produce $CO_2$ and water, or partly and to produce synthesis gas made up of CO and $H_2$.

This method using liquid feeds is particularly interesting because it allows upgrading of petroleum by-products in order to produce heat with capture of the $CO_2$ emitted, or to produce synthesis gas.

BACKGROUND OF THE INVENTION

Terminology

Chemical Looping Combustion method or CLC: In the text hereafter, what is referred to as CLC (Chemical Looping Combustion) is an oxidation-reduction or redox looping method on an active mass. It can be noted that, in general, the terms oxidation and reduction are used in connection with the respectively oxidized or reduced state of the active mass. The oxidation reactor is the reactor where the redox mass is oxidized and the reduction reactor is the reactor where the redox mass is reduced. During reduction of the redox mass, the fuel can be either totally oxidized, producing $CO_2$ and $H_2O$, or partly oxidized, producing synthesis gas CO and $H_2$.

Prior Art

Upgrading of heavy petroleum cuts that cannot be distilled under atmospheric conditions is often sought after.

A known way of directly upgrading petroleum cuts that cannot be distilled under atmospheric conditions (340° C.+cut) consists in burning them to produce energy. The combustion of this type of fuels however raises the problem of the capture of the $CO_2$ emitted in the fumes, harmful to the environment.

The CLC (Chemical Looping Combustion) method consists in using redox reactions of an active mass so as to split the combustion reaction into two successive reactions. A first reaction of oxidation of the active mass with air or a gas acting as the oxidizer allows, due to the exothermic character of the oxidation, a hot gas to be obtained whose energy can then be used. A second reaction of reduction of the active mass thus oxidized, by means of a reducing compound, then allows a reusable active mass and a gaseous mixture essentially comprising carbon dioxide and water to be obtained. This technique thus allows the carbon dioxide to be isolated in a gaseous mixture practically free of oxygen and nitrogen.

U.S. Pat. No. 5,447,024 describes a CLC method comprising an active mass reduction reactor using a reducing gas and an oxidation reactor allowing the active mass to be restored in its oxidized state by means of an oxidation reaction with humidified air. The circulating fluidized-bed technology is used to allow continuous change of the active mass from its oxidized state to its reduced state.

The active mass that alternately changes from its oxidized form to its reduced form, and vice versa, follows a redox cycle. It can be noted that, generally, the terms oxidation and reduction are used in connection with the respectively oxidized or reduced state of the active mass. The oxidation reactor is the reactor where the redox mass is oxidized and the reduction reactor is the reactor where the redox mass is reduced.

Thus, in the reduction reactor, the active mass ($M_xO_y$) is first reduced to the state $M_xO_{y-2n-m/2}$, by means of a hydrocarbon $C_nH_m$, which is correlatively oxidized to $CO_2$ and $H_2O$, according to reaction (1), or possibly to mixture $CO+H_2$ depending on the proportions used.

$$C_nH_m + M_xO_y \rightarrow nCO_2 + m/2 H_2O + M_xO_{y-2n-m/2} \qquad (1)$$

In the oxidation reactor, the active mass is restored to its oxidized state ($M_xO_y$) on contact with air according to reaction (2), before returning to the first reactor.

$$M_xO_{y-2n-m/2} + (n+m/4)O_2 \rightarrow M_xO_y \qquad (2)$$

The efficiency of the circulating fluidized bed CLC method is based to a large extent on the physico-chemical properties of the redox active mass. The reactivity of the redox pair(s) involved and the associated oxygen transfer capacity are parameters that influence the dimensioning of the reactors and the rates of circulation of the particles. The life of the particles depends on the mechanical strength of the particles and on their chemical stability. In order to obtain particles usable for this method, the particles involved generally consist of a redox pair or a series of redox pairs selected from among $CuO/Cu$, $Cu_2O/Cu$, $NiO/Ni$, $Fe_2O_3/Fe_3O_4$, $FeO/Fe$, $Fe_3O_4/FeO$, $MnO_2/Mn_2O_3$, $Mn_2O_3/Mn_3O_4$, $Mn_3O_4/MnO$, $MnO/Mn$, $Co_3O_4/CoO$, $CoO/Co$, and of a binder providing the required physico-chemical stability.

Many studies have been conducted with gas feeds (essentially methane) and solid feeds, and they have shown the feasibility of chemical looping combustion for this type of feeds.

For gas feeds, a direct reactive chemistry occurs between the oxidized solid particles and the fuel. As for solid feeds, they first have to be gasified (to synthesis gas CO and $H_2$) to allow conversion thereof on contact with the redox mass. Gasification thus represents the temporally limiting stage. Therefore, in order to increase the residence time of the solid feed, the unconverted feed from the reduction reactor is separated from the redox mass (through density difference between the solid feed and the redox mass via a solid/solid separator—U.S. Pat. No. 2,896,709) to be recycled.

Patent application WO-2008/036,902 A2 describes the CLC method applied in a general way to various feeds: gaseous, liquid and solid. The use of heavy liquid feeds, refining products that have the particular feature of not being distillable under atmospheric conditions, is not considered.

Using liquid fuels generates additional implementation difficulties that are not encountered for gaseous or solid feeds, i.e. vaporization of the feed on contact with the redox masses and coke formation around the redox particles. Unlike solid feeds, it is not possible to consider separating the unburnts (coke settled on the redox mass) from the redox mass for recycle to the reduction reactor (too slight particle density and size differences). The residence time of the liquid feed in this reactor is advantageously strictly controlled to guarantee oxidation of the vaporized feed, as well as gasification of the coke formed and oxidation thereof, in order to obtain the desired oxidation level in a single pass.

We have discovered that the combustion of heavy liquid feeds can be carried out in a Chemical Looping Combustion type process, by contacting the liquid feed with a redox mass in a fluidized bed, in order to upgrade the heavy liquid petroleum fractions resulting from refining, while avoiding the problem of $CO_2$-rich fumes.

OBJECTS OF THE INVENTION

The object of the invention is to use the chemical looping combustion method for upgrading heavy liquid feeds, in order to either produce energy by oxidizing totally the heavy liquid feeds, while allowing direct capture of the $CO_2$ emitted in the combustion fumes, or to produce a synthesis gas (hydrogen and carbon monoxide compound).

DESCRIPTION OF THE INVENTION

The invention consists in contacting a heavy liquid feed, i.e. with less than 10% of its constituents whose boiling point temperature under atmospheric conditions is below 340° C., with a redox mass in a fluidized bed in order to carry out combustion thereof in a Chemical Looping type process.

Summary of the Invention

The invention relates to a method for upgrading a liquid feed consisting of hydrocarbon fractions, alone or in admixture, less than 10% of which have a boiling point temperature below 340° C., by fluidized-bed redox chemical looping combustion.

Preferably, the liquid feed comprises a vacuum distillation residue.

Advantageously, the liquid feed is atomized in the fluidized bed.

Preferably, the temperature of the fluidized bed ranges between 700° C. and 1200° C.

In an embodiment, partial combustion of the feed is carried out.

In this case, synthesis gas is produced.

The gas allowing fluidization can comprise steam, and the method allows a gaseous mixture $CO_2 + H_2$ to be produced.

In another embodiment, total combustion of the feed is carried out.

In this case, the method allows both energy production and capture of the $CO_2$ emitted.

Detailed Description of the Invention

Method

The Chemical Looping method is implemented by means of a circulating fluidized bed using two interconnected reactors. In the first one, the oxidation reactor, the redox mass is oxidized on contact with air. After separation of the oxidized mass and of the oxygen-depleted air, the redox mass is injected into the second reactor, the combustion chamber or the reduction reactor. The fuel injected consumes the oxygen of the carrier (redox mass reduction) and is oxidized to a mixture mainly made up of $CO_2$ and water, easy to separate. The reduced mass is then reinjected into the first reactor to follow a new cycle.

This method is implemented using a circulating fluidized bed.

The reaction time ranges between 10 seconds and 10 minutes, preferably between 1 minute and 5 minutes.

It is possible to fluidize the redox mass with steam, and/or $CO_2$ and/or sulfur-containing compounds SOx as the fluidization gas.

The temperature of the redox mass (bed temperature) upon contacting ranges between 700° C. and 1200° C., preferably between 800° C. and 1000° C.

According to the use of the combustion gases, the pressure of the method is adjusted. Thus, to carry out total combustion, a low pressure is preferably applied so as to minimize the gas compression energy cost and thus to maximize the energy yield of the plant. To produce synthesis gas, one will advantageously work under pressure in some cases, in order to avoid compression of the synthesis gas upstream from the downstream synthesis process: the Fischer-Tropsch process operating for example at pressures ranging between 20 and 40 bars, it may be interesting to produce the gas at a higher pressure.

The oxygen storage capacity of the redox mass advantageously ranges, depending on the type of material, between 4 and 30 wt. %. The redox mass can consist of metal oxides, alone or in admixture, with or without a binder, of ceria-zirconia metal oxides, spinels, ore (such as ilmenite), perovskites, or any other mass having the required redox properties and the characteristics necessary for fluidization.

The utilization rate of the available oxygen generally ranges between 2 and 50 wt. %, preferably between 5 and 20 wt. %.

Feed Injection

The liquid feed is injected in the dense bed of the reduction reactor. It is preferably atomized within the fluidized bed so as to form droplets of a size close to the size of the particles, in order to optimize the liquid-solid contact. In fact, part of the liquid feed vaporizes on contact with the hot redox mass, the other part condenses so as to form a coke deposit at the surface of the redox mass.

The liquid feed can be preheated, notably to reduce the viscosity thereof.

The residence time of the redox mass is advantageously at least equal to the reaction time of the liquid feed. The residence time of the redox mass advantageously ranges between 10 seconds and 10 minutes, preferably between 1 minute and 5 minutes.

The ratio between the mass flow ratio of redox mass and the mass flow ratio of feed advantageously ranges between 20 and 1000, preferably between 50 and 400.

Liquid Feeds

The liquid feeds that can be used in this fluidized-bed chemical looping combustion method concern any liquid hydrocarbon fraction from petroleum production or refining whose boiling point temperature under atmospheric conditions is predominantly above 340° C. (i.e. any cut whose distillation curve shows that less than 10% of its constituents boils at a temperature below 340° C.).

The feeds concerned are notably atmospheric residue type cuts (residues from distillation performed under atmospheric conditions), or preferably vacuum residue type cuts (vacuum distillation residues) for which less than 10% of the constituents has a boiling point temperature below 500° C., or finally deasphalting residues consisting of the precipitate obtained after contact with a paraffinic solvent consisting of an alkane whose number of carbon atoms ranges between 3 and 7.

The feed thus predominantly contains heavy fractions difficult to convert and that cannot be integrated in fuel bases, alone or in admixture, such as bunker fuels, atmospheric or vacuum distillation residues, conversion process residues (ebullated-bed hydroconversion, FCC), asphalts from deasphalting processes, notably propane, butane, pentane, hexane, heptane deasphalting, or bitumens (for example non-distillable Canadian heavy crude fractions).

The percentage of solid residue resulting from vaporization and pyrolysis of a petroleum product is defined by its Conradson carbon. The method according to the invention allows heavy feeds having a Conradson carbon up to 40% to be upgraded.

Similarly, the method according to the invention is advantageously applicable to heavy feeds having a precipitating asphaltene content in heptane up to 25%.

Total or Partial Combustion

If the oxidation of the liquid feed is complete, the method according to the invention allows highly $CO_2$-concentrated fumes (that can be compressed, transported and stored) to be obtained. The method according to the invention can thus be used for $CO_2$ capture.

If the oxidation of the liquid feed is partial, the method according to the invention allows synthesis gas (CO and $H_2$) to be produced.

In the case of partial combustion, the active mass/fuel ratio is generally adjusted so as to achieve partial oxidation of the fuel, producing a synthesis gas in form of a $CO+H_2$ mixture.

In order to obtain only partial oxidation of the feed, it is also possible, in relation to the conditions required to obtain total combustion by Chemical Looping Combustion, to:
- decrease the residence time of the particles in the oxidation reactor (so as not to oxidize the particles entirely)
- use a redox mass having a lower oxygen storage capacity
- decrease the circulation rate of the metal oxides in the oxidation reactor
- increase the flow rate of the feed in the reduction reactor.

This synthesis gas can be used as the feed in other chemical conversion processes, notably the Fischer-Tropsch process allowing to produce, from synthesis gas, long hydrocarbon-chained liquid hydrocarbons that can thereafter be used as fuel bases.

In cases where the fluidization gas used is steam or a mixture of steam and other gas(es), the water-gas shift reaction ($CO+H_2O \Rightarrow CO_2+H_2$) can also take place, which leads to the production of a $CO_2+H_2$ mixture at the reactor outlet.

In this case, the combustion gas can be used for energy production, considering its calorific value.

It is also possible to consider using this gas for hydrogen production, for example in order to supply hydrogenation units, hydrotreatment units for refining, or a hydrogen supply network (after water-gas shift reaction).

In the case of total combustion, the gas stream at the reduction reactor outlet essentially consists of $CO_2$ and steam. A $CO_2$ stream ready to be sequestered is then obtained by condensation of the steam. The method can thus be used for energy production, while allowing capture of the $CO_2$ contained in the fumes.

DESCRIPTION OF THE FIGURES

FIGS. 1 to 4 illustrate the invention without limiting the scope thereof.

FIG. 1: Diagram of the experimental setup used in the example. The abbreviations used are:
Cd: condenser
Gf: chiller
Ft: filter
An: analyzer
FID: Flame Ionization Detector
GV: steam generator
T°: temperature measurement
$T_L$: bed temperature measurement
$T_F$: oven temperature measurement
P: pressure measurement.

EXAMPLE

The example below illustrates the invention by way of non limitative example.

Total combustion by chemical looping of various liquid feeds (furnace fuel oil: feed not in accordance with the invention and heavy fuel oil No. 2: feed in accordance with the invention) has been observed.

Figure 5:
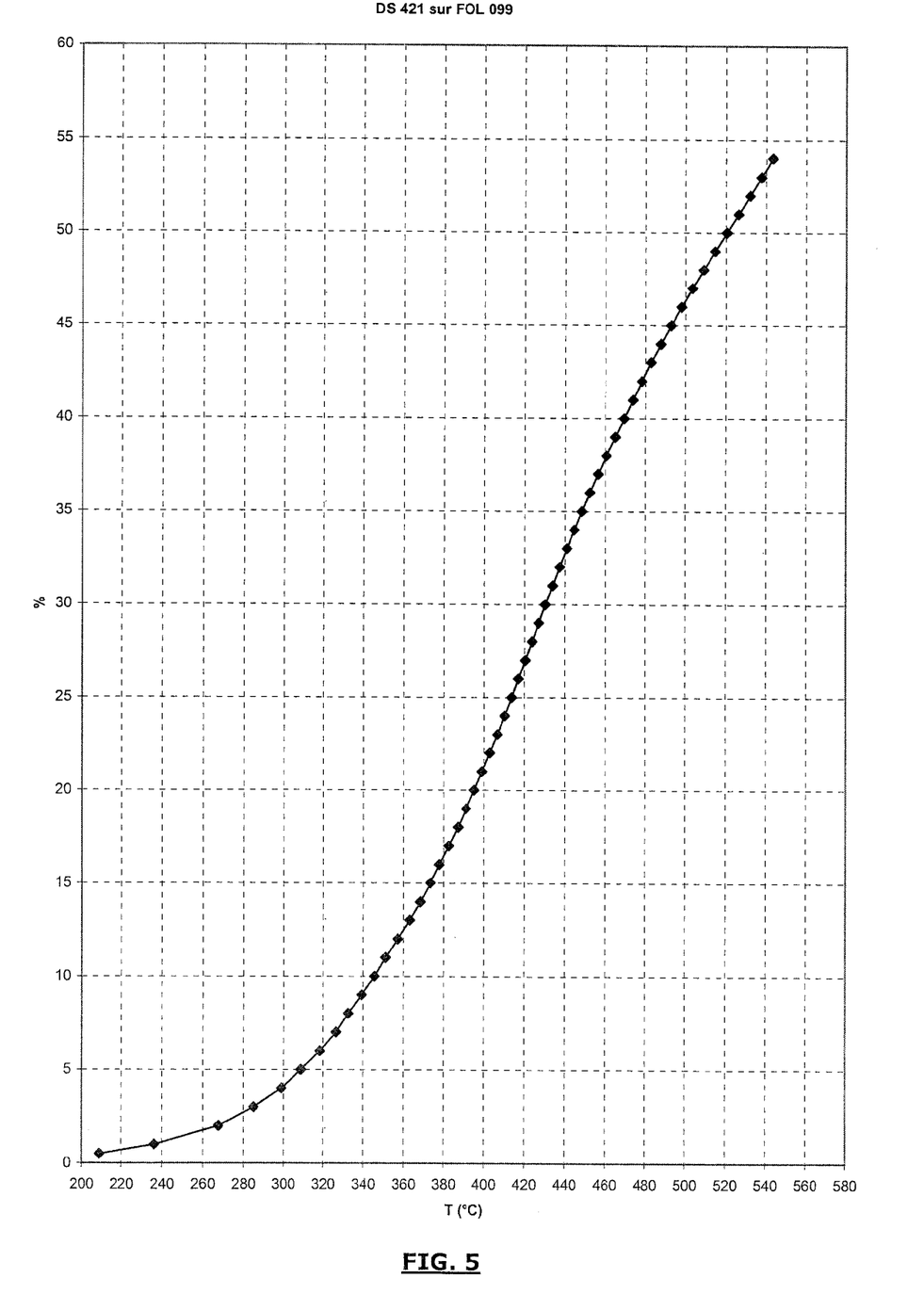
FIG. 5: Simulated distillation curve (DS421) of heavy fuel oil No. 2 of the example (volume fraction as a function of temperature T in C°).

The characteristics of heavy fuel oil No. 2 are as follows:
Density at 15° C.: 0.9858
Kinematic viscosity: 38 $mm^2$/s at 100° C.
Kinematic viscosity: 522 $mm^2$/s at 50° C.
Sulfur S content: 1.3 wt. %
Hydrogen H content: 10.8 wt. %
Volume fraction having a boiling point temperature below 340° C.: 9 vol. %
The simulated distillation curve (D5421) of heavy fuel oil No. 2 (feed in accordance with the invention) is given in FIG. 5.

By way of comparison, the furnace fuel oil has a density at 15° C. of 0.8562, a sulfur content of 0.1 wt. % and a hydrogen H content of 12.4 wt. %. Besides, the furnace fuel oil fraction having a boiling point temperature below 340° C. represents 87 vol. %.

Figure 1:
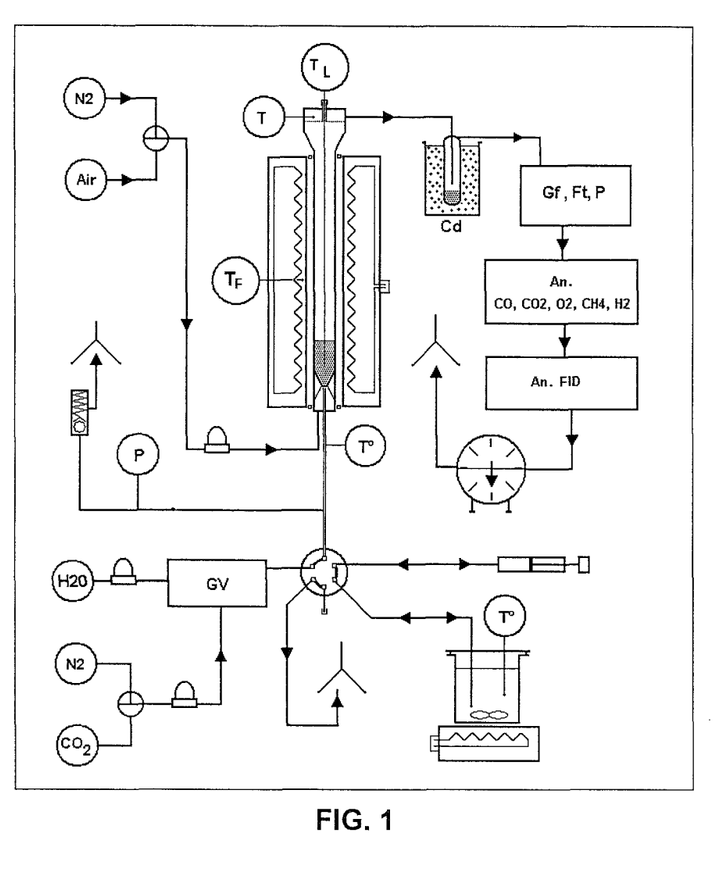

The experimental tool used (see FIG. 1) consists of a quartz reactor containing a redox mass fluidized bed, a liquid injection system in the reactor and a fumes analysis system. The reactor is made of quartz, its inside diameter is 2 cm. The reactor can be fluidized by various gases (air, nitrogen, $N_2$, $CO_2$, $H_2O$) and supplied with various liquids. The liquids to be tested can be first heated up to 180° C. in order to decrease the viscosity thereof if need be, and to ensure injection thereof in the reactor. The redox mass (45 g) forms a bed of solid particles made of nickel oxides NiO on $NiAl_2O_4$ support (60 wt. %/40 wt. % in proportion), of grain size ranging between 100 and 300 µm, permanently fluidized. In order to obtain a simulation of the Chemical Looping Combustion process, a reactor operating batchwise with the fluidized redox mass is used (without redox mass circulation).

The metal oxides undergo several oxidation-reduction cycles. During the metal oxidation stage, the bed is air fluidized. During the metal reduction stage, point injection of a predetermined amount of liquid feed (2 ml) is achieved in the solid particle bed, the bed being then fluidized by nitrogen.

Figure 2:
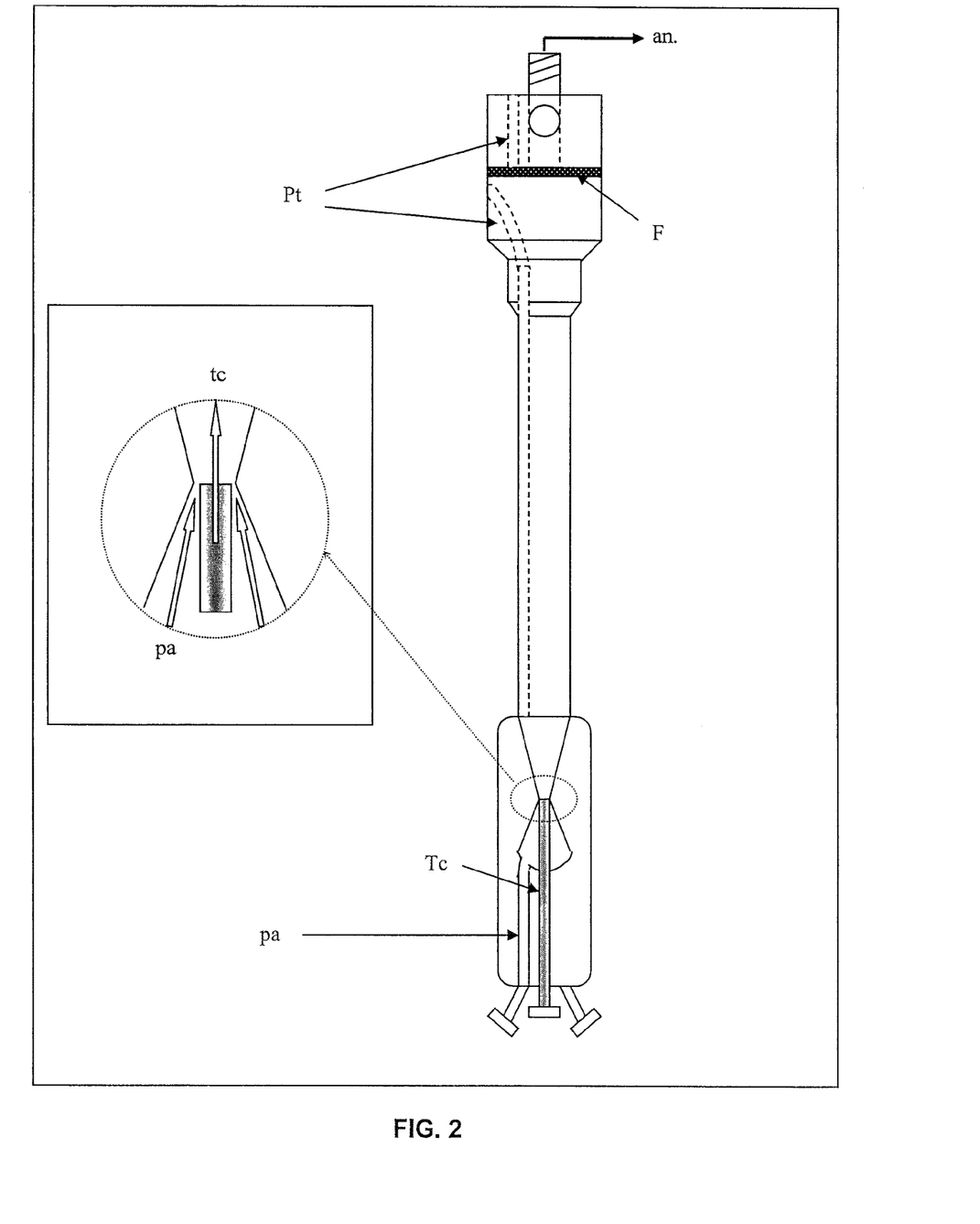
FIG. 2: Diagram of the reactor used in the example and detail of the part allowing injection, consisting of a central tube (tc) and of an annular part (pa):
An: analyzer
F: fritted
Pt: thermocouple wells.

The fluidization gas flow rate in the reactor is evenly distributed in two zones (see FIG. 2): by the central tube (30 NI/h) and by the annular part (30 NI/h).

A 6-way valve, a liquid feed tank B and a syringe S are used for point injection of the feed into the reactor. The injection protocol is described in FIG. 3. Syringe S is first filled with the liquid feed (position 1 of the 6-way valve, filling of syringe S). During the redox mass oxidation stage, the valve is in position 1, the liquid contained in syringe S being driven towards feed tank B; the bed is fluidized by fluidization gas Gf, which is air (30 NI/h in the central tube and 30 NI/h in the annular part).

Figure 3:
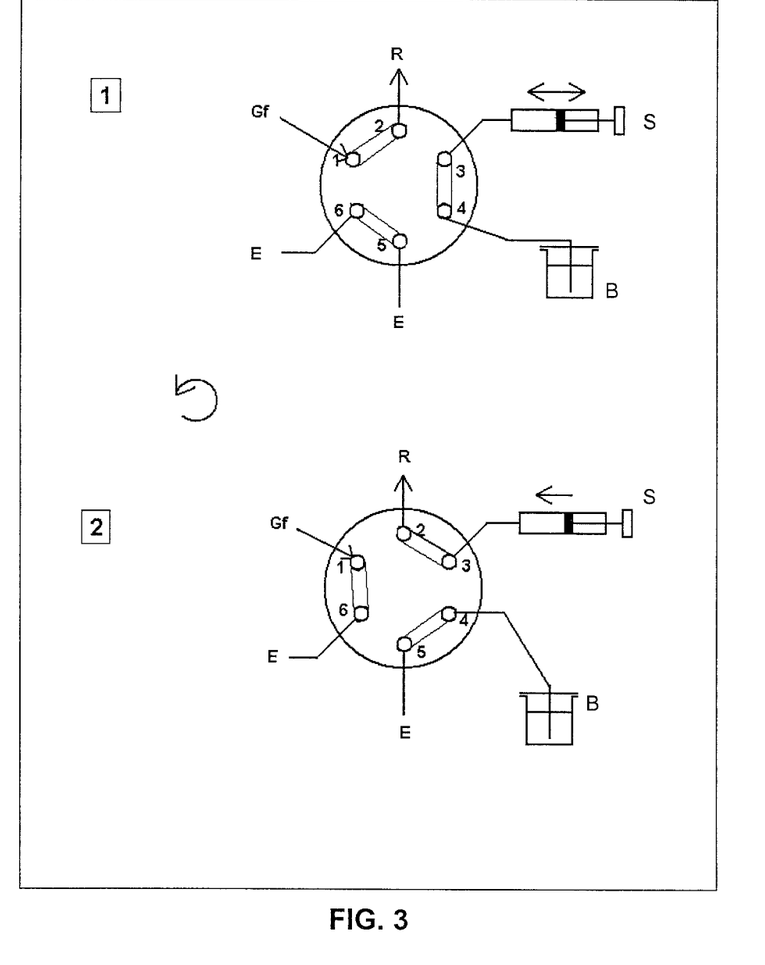
FIG. 3: Diagram of the injection system using a 6-way valve used in the example, where each way is numbered from 1 to 6. Injection is performed from a feed tank B by means of a syringe S. The 6-way valve allows alternating the injection of feed and of fluidization gas Gf in reactor R, the fluidization gas being sent to vent hole E during injection of the feed.

Once the metal entirely oxidized (the oxygen of the air being totally restored at the reactor outlet), fluidization gas Gf is replaced by nitrogen. During the redox mass reduction stage, the valve is switched to position 2 for the duration of the injection of the feed (two seconds). The liquid, pushed by the syringe, is then sent to reactor R through the central tube; the bed is fluidized by nitrogen (30 NI/h in the annular part). After the programmed injection time, the valve is switched back to position 1. The bed is then fluidized by the nitrogen flowing through the central tube and the annular part, the liquid feed pushed by the syringe being sent to the feed tank. The fumes are analyzed on a continuous basis by a multi-gas analyzer NGA 2000MLT4 (An. CO, $CO_2$, $O_2$, $CH_4$, $H_2$) for $CO/CO_2/CH_4/O_2/H_2$ measurements. An FID (Flame Ionization Detector: An. FID) type device also allows measuring of the total carbon concentration.

Figure 4:
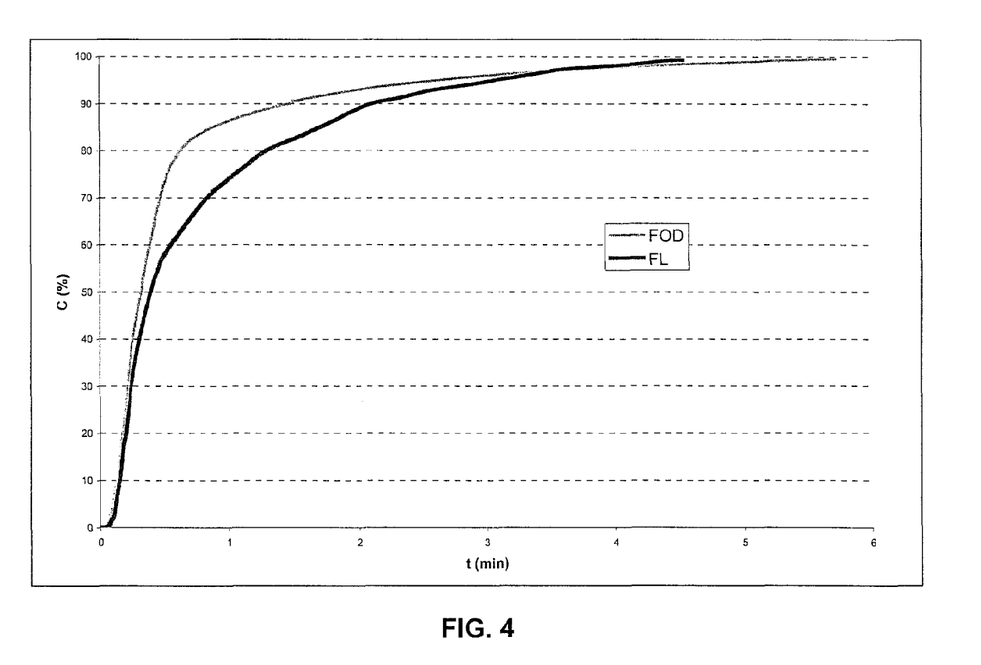
FIG. 4: Graph showing the carbon emitted in % C in form of $CO_2$ as a function of time t in minutes for furnace fuel oil FOD and heavy fuel oil FL No. 2 feeds with point injection at t=0, on $NiO/NiAl_2O_4$ at 900° C. (example).

The two liquid feeds described above have been tested: furnace fuel oil and heavy fuel oil No. 2. The nickel oxide of the redox mass is first totally oxidized. The bed temperature ($T_L$) upon injection of the various liquid feeds is 900° C. FIG. 4 shows the percentage of carbon emitted in the fumes in form of $CO_2$ as a function of time; 2 ml liquid feed are injected in 2 seconds at t=0. It is observed that almost all of the carbon contained in the two liquid feeds tested (>99 wt. %) is converted to $CO_2$. The nickel oxide reduction reaction being endothermic, a bed temperature decrease of about 30° C. is observed with the two feeds. During re-oxidation of the metal, a limited amount of $CO_2$ is emitted (<1 wt. % of the carbon contained in the injected feed), which shows that there is no or very little residual coke on the redox mass. The exothermicity observed during oxidation of the metal generates a bed temperature increase of about 30° C. These experiments show the feasibility of the chemical looping combustion method applied to heavy liquid feeds (such as the heavy fuel oil No. 2 tested), notably to petroleum residues.

With the experimental tool described in the example, partial combustion by chemical looping can be performed in the same way for the production of synthesis gas, for example by decreasing the amount of oxygen stored in the metal oxides.

This experiment shows that, by varying the amount of available oxygen stored in the metal oxides, the CLC method can be used either to produce energy while capturing the $CO_2$ emitted in the fumes (total combustion, high metal oxidation level), or to produce synthesis gas (partial combustion, low metal oxidation level).

The invention claimed is:

1. A method for combusting a liquid feed by fluidized-bed redox chemical looping combustion, comprising:
    oxidizing a redox mass on contact with air in an oxidation reactor to produce an oxidized redox mass and oxygen depleted air;
    separating the oxidized redox mass and the oxygen depleted air;
    contacting a liquid feed comprising hydrocarbon fractions, alone or in admixture, less than 10 vol. % of which have a boiling point temperature below 340° C., with the oxidized redox mass as a fluidized bed in a reduction or combustion reactor to produce a reduced redox mass and an oxidized liquid feed; wherein a residence time of the redox mass in the reduction or combustion reactor ranges between 1 and 5 minutes, the liquid feed is atomized within the fluidized bed, part of the liquid feed vaporizes on contact with the redox mass, and another part of the liquid feed condenses so as to form a coke deposit at a surface of the redox mass; and
    reinjecting the reduced redox mass into the oxidation reactor,
    wherein the liquid feed is selected from the group consisting of a residue from distillation and a residue from deasphalting, and
    wherein a utilization rate of the available oxygen ranges between 2 and 50 wt. %.

2. A method for combusting a liquid feed as claimed in claim 1, wherein the liquid feed comprises a vacuum distillation residue.

3. A method for combusting a liquid feed as claimed in claim 1, wherein the temperature of the fluidized bed ranges between 700° C. and 1200° C.

4. A method for combusting a liquid feed as claimed in claim 1, wherein the liquid feed is partially combusted in the reduction or combustion reactor.

5. A method for combusting a liquid feed as claimed in claim 4, wherein synthesis gas is produced.

6. A method for combusting a liquid feed as claimed in claim 4, wherein the fluidized bed is fluidized by a gas comprising steam and wherein, after a water-gas shift reaction, a $CO_2+H_2$ mixture is produced at an outlet of the reduction or combustion reactor.

7. A method for combusting a liquid feed as claimed in claim 1, wherein the liquid feed is totally combusted in the reduction or combustion reactor.

8. A method for combusting a liquid feed as claimed in claim 7, further comprising energy production and capture of $CO_2$ emitted.

* * * * *